(12) United States Patent
Andrews

(10) Patent No.: US 10,541,833 B2
(45) Date of Patent: Jan. 21, 2020

(54) SYSTEM AND METHOD FOR AUTOMATICALLY SELECTING BAUD RATE IN A CAN NETWORK

(71) Applicant: SCHNEIDER ELECTRIC IT CORPORATION, West Kingston, RI (US)

(72) Inventor: Bibin Andrews, Kerala (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/108,919

(22) PCT Filed: Dec. 30, 2013

(86) PCT No.: PCT/US2013/078323
§ 371 (c)(1),
(2) Date: Jun. 29, 2016

(87) PCT Pub. No.: WO2015/102579
PCT Pub. Date: Jul. 9, 2015

(65) Prior Publication Data
US 2016/0330044 A1 Nov. 10, 2016

(51) Int. Cl.
*H04L 12/28* (2006.01)
*H04L 12/40* (2006.01)
*H04L 5/00* (2006.01)
*H04L 29/06* (2006.01)

(52) U.S. Cl.
CPC ........ *H04L 12/4013* (2013.01); *H04L 5/0055* (2013.01); *H04L 69/28* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 6,708,239 B1 * | 3/2004 | Ellerbrock | H04L 12/40032 710/62 |
| 7,359,436 B2 * | 4/2008 | Berthy | H04L 41/00 375/225 |
| 7,505,837 B2 * | 3/2009 | Somos | G01M 17/00 235/472.01 |

(Continued)

OTHER PUBLICATIONS

Notification of Transmittal of the International Search Report and the Written Opinion of the International Searching Authority from corresponding PCT/US2013/078323 dated Apr. 23, 2014.

(Continued)

*Primary Examiner* — Kwang B Yao
*Assistant Examiner* — Juvena W Loo
(74) *Attorney, Agent, or Firm* — Lando & Anastasi, LLP

(57) ABSTRACT

According to various aspects and embodiments, a device is provided. The device includes a memory, a Controller Area Network (CAN) controller coupled to a CAN bus, at least one processor coupled to the memory and the CAN controller. The at least one processor is configured to set the CAN controller to a first baud rate, determine a second baud rate, and send, in response to determining the second baud rate, a baud rate change request via the CAN bus, wherein the baud rate change request includes a least an identifier of the second baud rate.

17 Claims, 8 Drawing Sheets

(56) References Cited

U.S. PATENT DOCUMENTS

| | | | |
|---|---|---|---|
| 7,594,226 B2 | 9/2009 | Stelzer et al. | |
| 2002/0091838 A1 | 7/2002 | Rupp et al. | |
| 2002/0122431 A1* | 9/2002 | Cho | H04B 1/70755 |
| | | | 370/465 |
| 2006/0056439 A1* | 3/2006 | Kohri | H04L 12/6418 |
| | | | 370/437 |
| 2006/0149437 A1 | 7/2006 | Somos | |
| 2007/0124627 A1* | 5/2007 | Katano | H04L 1/0002 |
| | | | 714/708 |
| 2010/0180162 A1* | 7/2010 | Cardwell | G06F 11/0745 |
| | | | 714/47.1 |
| 2011/0007759 A1 | 1/2011 | Dawson et al. | |
| 2014/0148920 A1* | 5/2014 | Englert | G05B 19/0426 |
| | | | 700/3 |

OTHER PUBLICATIONS

Extended European Search Report from corresponding European Application No. 13900765.2 dated Jun. 14, 2017.

* cited by examiner

United States Patent US 10,541,833 B2

SYSTEM AND METHOD FOR AUTOMATICALLY SELECTING BAUD RATE IN A CAN NETWORK

CROSS-REFERENCE TO RELATED APPLICATIONS

This application is a U.S. National Stage Application under 35 U.S.C. § 371 of International Application No. PCT/US2013/078323, filed Dec. 30, 2013, titled SYSTEM AND METHOD FOR AUTOMATICALLY SELECTING BAUD RATE IN A CAN NETWORK, which is hereby incorporated herein by reference in its entirety.

BACKGROUND

Technical Field

The technical field relates generally to communication between microprocessor-based devices and, more specifically, to systems and methods for automatically selecting transmission baud rates for devices coupled via a bus.

Background Discussion

Controller Area Network (CAN) communication is one method of communicating between microprocessor-based devices. Typically, a device includes a CAN controller which is communicatively coupled to a CAN bus. Communication with other devices is generally at a fixed baud rate. A lower baud rate enables long distance communication with minimal errors, but at the expense of speed. Higher baud rates are prone to data errors if there is degradation in CAN bus channel quality. These data errors may increase framing errors resulting in a lesser overall throughput over the CAN bus.

SUMMARY

According to some embodiments, a device is provided. The device includes a memory, a Controller Area Network (CAN) controller coupled to a CAN bus, at least one processor coupled to the memory and the CAN controller. The at least one processor being configured to set the CAN controller to a first baud rate, determine a second baud rate, and send, in response to determining the second baud rate, a baud rate change request via the CAN bus, wherein the baud rate change request includes at least an identifier of the second baud rate.

In one embodiment, the at least one processor is further configured to determine a timeout has elapsed, send, in response to determining the timeout has elapsed, a baud rate confirmation request via the CAN bus, and set the CAN controller to the second baud rate.

In one embodiment, the at least one processor is further configured to receive a data frame from at least one device coupled to the CAN bus, determine, in response to receiving the data frame, that the CAN bus does not support the second baud rate based on an error count of the CAN controller, determine a lower baud rate, wherein the lower baud rate is less than the second baud rate, and send a baud rate change request via the CAN bus, wherein the baud rate change request includes at least an identifier of the lower baud rate.

In one embodiment, the at least one processor is further configured to receive a data frame from at least one device coupled to the CAN bus, determine, in response to to receiving the data frame, that the CAN bus supports the second baud rate based on an error count of the CAN controller, determine a higher baud rate, wherein the higher baud rate is greater than the second baud rate, and send a baud rate change request via the CAN bus, wherein the baud rate change request includes at least an identifier of the higher baud rate.

In one embodiment, the at least one processor is further configured to receive a data frame from at least one device coupled to the CAN bus, determine, in response to receiving the data frame, that a CAN device coupled to the CAN bus does not support the second baud rate, and operate the CAN controller at the first baud rate.

In one embodiment, the at least one processor is further configured to determine that a first timeout has occurred, and switch, based on the first timeout, to a client mode.

In one embodiment, the at least one processor is further configured to send at least one test data frame via the CAN bus, wherein the at least one test data frame includes a pattern of bytes causing the CAN bus to be signaled at a high frequency.

In one embodiment, the at least one processor is further configured to receive a baud rate change request from a device coupled to the CAN bus, wherein the baud rate change request includes at least one identifier of a new baud rate, determine if the new baud rate is supported by the CAN controller, and send a negative acknowledgement via the CAN bus if the new baud rate is not supported by the CAN controller.

According to another embodiment, a computer-implemented method of selecting baud rates using a computer is provided. The computer includes a memory, a Controller Area Network (CAN) controller coupled to a CAN bus, and at least one processor coupled to the CAN controller and the memory. The method includes acts of setting the CAN controller to a first baud rate, determining a second baud rate, and sending, in response to determining the second baud rate, a baud rate change request via the CAN bus, wherein the baud rate change request includes at least an identifier of the second baud rate.

The method may further include acts of determining a timeout has elapsed, sending, in response to determining the timeout has elapsed, a baud rate confirmation request via the CAN bus, and setting the CAN controller to the second baud rate.

The method may further include acts of receiving a data frame from at least one device coupled to the CAN bus, determining, in response to receiving the data frame, that the CAN bus does not support the second baud rate based on an error count of the CAN controller, determining a lower baud rate, the lower baud rate being less than the second baud rate, and sending a baud rate change request via the CAN bus, wherein the baud rate change request includes at least an identifier of the lower baud rate.

The method may further include acts of receiving a data frame from at least one device coupled to the CAN bus, determining, in response to receiving the data frame, that the CAN bus supports the second baud rate based on an error count of the CAN controller, determining a higher baud rate, the higher baud rate being greater than the second baud rate, and sending a baud rate change request via the CAN bus, wherein the baud rate change request includes at least an identifier of the higher baud rate.

The method may further include acts of receiving a data frame from at least one device coupled to the CAN bus, determining, in response to receiving the data frame, that a CAN device coupled to the CAN bus does not support the second baud rate, and operating the CAN controller at the first baud rate.

In one embodiment, the method may further include acts of determining a first timeout has occurred, and switching, based on the first timeout, to a client mode. In this embodiment, the method may further include acts of sending at least one test data frame via the CAN bus, wherein the at least one test data frame includes a pattern of bytes causing the CAN bus to be signaled at a high frequency.

The method may further include acts of receiving a baud rate change request via the CAN bus, wherein the baud rate change request includes at least one identifier of a new baud rate, determining if the new baud rate is supported by the CAN controller, and sending a negative acknowledgement via the CAN bus if the new baud rate is not supported by the CAN controller.

According to another embodiment, a non-transitory computer readable medium having stored thereon sequences of instruction instructions for selecting baud rates for a device coupled to a Controller Area Network (CAN) bus is provided. The instructions causing at least one processor to set a CAN controller to a first baud rate, determine a second baud rate, and send, in response to determining the second baud rate, a baud rate change request via the CAN bus, wherein the baud rate change request includes at least an identifier of the second baud rate.

In one embodiment, the sequences of instructions include instructions that cause the at least one processor to determine a timeout has elapsed, send, in response to determining the timeout has elapsed, a baud rate confirmation request via the CAN bus, and set the CAN controller to the second baud rate.

In one embodiment, the sequences of instructions include instructions that cause the at least one processor to receive a data frame from at least one device coupled to the CAN bus, determine, in response to receiving the data frame, that the CAN bus does not support the second baud rate based on an error count of the CAN controller, determine a lower baud rate, wherein the lower baud rate is less than the second baud rate, and send a baud rate change request via the CAN bus, wherein the baud rate change request includes at least an identifier of the lower baud rate.

In one embodiment, the sequences of instructions include instructions that cause the at least one processor to receive a data frame from at least one device coupled to the CAN bus, determine, in response to receiving the data frame, that the CAN bus supports the second baud rate based on an error count of the CAN controller, determine a higher baud rate, wherein the higher baud rate is greater than the second baud rate, and send a baud rate change request via the CAN bus, wherein the baud rate change request includes at least an identifier of the higher baud rate.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, devices communicate via a CAN bus typically at fixed rates of communication. Communication distance may be maximized by low-speed baud rates; however, low-speed baud rates may result in slow response times between devices. Conversely, high-speed baud rates (e.g., 1 Mbps) may result in framing errors if there is degradation in the quality of the CAN bus (e.g., signal reflections). Some aspects and embodiments disclosed herein include a system and method for automatically adjusting baud rates of devices coupled to a CAN bus.

Baud Rate Auto-Selection System

Figure 1:
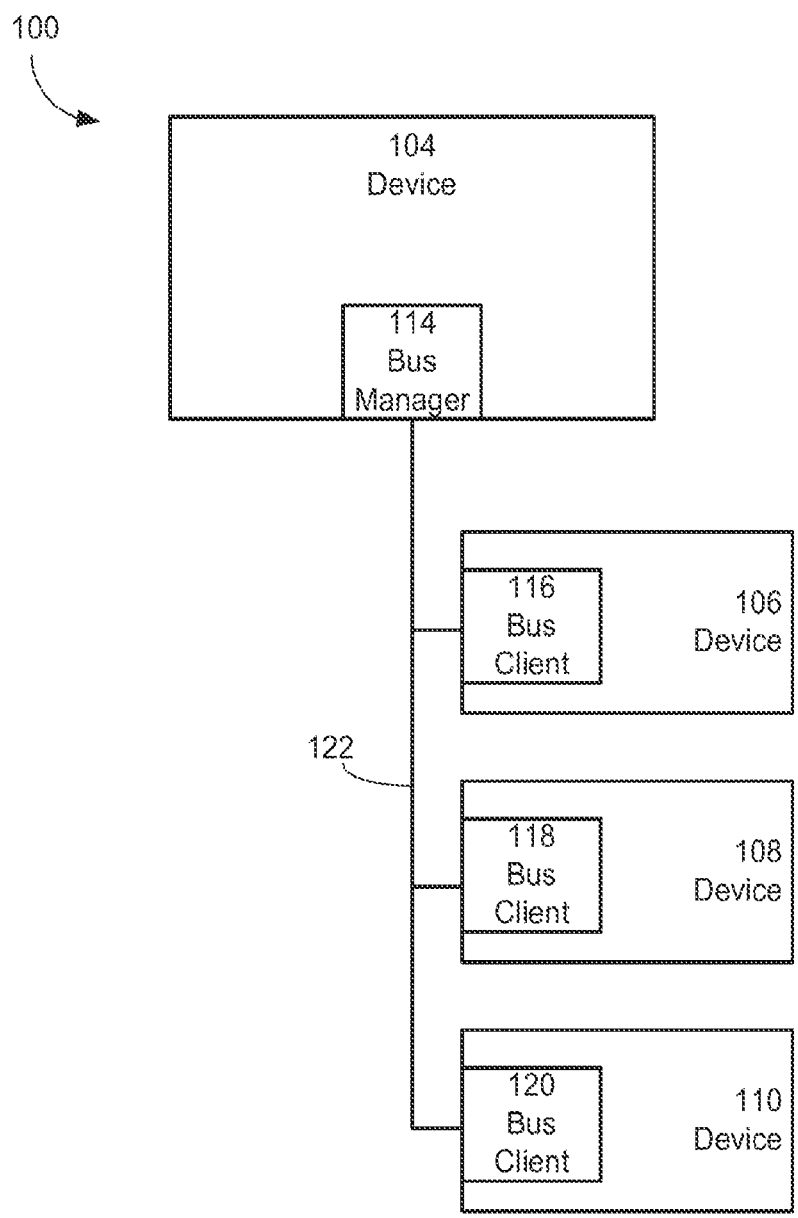
FIG. 1 is a block diagram illustrating one example of a baud rate auto-selection system.

Various examples disclosed herein implement a baud rate auto-selection system on one or more computer systems. FIG. 1 illustrates one example of a baud rate auto-selection system 100. As shown, the baud rate auto-selection system 100 includes a device 104, a device 106, a device 108, and a device 110. As illustrated, each of the devices 104, 106, 108, and 110 includes a CAN controller 114, 116, 118 and 120, respectively, that is configured as either a "Bus Manager" or "Bus Client" for communication via a CAN bus 122. In at least one embodiment, only one device coupled to the CAN bus 122 operates as the Bus Manager at a given time. In this embodiment, a device may dynamically switch from operating as a Bus Client to the Bus Manager in the event a device determines that no Bus Manager is present. Accordingly, any one of the devices 104, 106, 108, and 110 may operate as the Bus Manager or as a Bus Client.

In one embodiment, each of the devices 104, 106, 108, and 110 is implemented using a computer system, such as the computer system 200 discussed further below with reference to FIG. 2. In other embodiments, the devices 104, 106, 108, and 110 include computing resources but primarily function as devices other than computer systems. For instance, in these embodiments, the devices 104, 106, 108, and 110, may be uninterruptable power supplies, power devices (e.g., transformers, smart batteries, and power distribution units), sensors, actuators, etc.

The CAN bus 122 may include any communication network through which microprocessor-based devices send and receive information. For example, the CAN bus 122 may be a physical data bus between two components of the same device. In other examples, the CAN bus 122 may be any physical layer (e.g., serial, Ethernet, etc) configured to facilitate CAN signaling between two or more devices in accordance with ISO 11898-1:2003.

As shown, the device 104 includes a CAN controller 114 configured in a Bus Manager mode via software processes. In this mode, the device 104 may interface and control the CAN controller 114 via computer-implemented processes, such as the processes described in FIGS. 3-8, to manage baud rate selection. In one embodiment, the device 104 may configure itself as the Bus Manager based on determining that no other device of the CAN bus 122 is operating as the Bus Manager.

Once a device begins operating as the Bus Manager, the device may periodically perform bus management functions. In one embodiment, the device 104 may periodically send out keep-alive messages via the CAN bus 122 to indicate to other devices coupled to the CAN bus 122 (e.g., devices 106, 108, and 110) that a Bus Manager is present. In other embodiments, the Bus Manager continuously monitors communication quality of the CAN bus 122 and adjusts baud rates accordingly.

In various embodiments, during the startup of a device (e.g., devices 104, 106, 108, and 110) the device enters a "listen only" mode to determine which role (e.g., Bus Manager or Bus Client) the device should take. In one embodiment, if no communication is received via the CAN bus 122 after a predetermined period of time (e.g., 1 second), the device will operate as a Bus Manager. In other embodiments, the device will operate as a Bus Client in the event a Bus Manager is already present on the CAN bus 122. In these embodiments, the listen only mode continues until a baud rate is identified by the device. The listen only mode may reduce the potential of framing errors being introduced by the device on the CAN bus 122. In at least one embodiment, a device will initially configure itself to the lowest possible baud rate (e.g., 62.5 Kb). In other embodiments, a device will initially configure itself at the highest possible baud rate. In all of these embodiments, the device may determine a baud-rate mismatch based on detecting a framing error. If a mismatch is detected, the device may step-up, or step-down, to the next baud rate. Once a valid data frame is received, and thus a valid baud rate set, the device may continue to operate at the valid baud rate until a baud rate switch command (BUAD_RATE_SWITCH) is received from the Bus Manager.

In one embodiment, a device configured as a Bus Client periodically transmits test data frames which include a predefined pattern of bytes in all data frame fields which creates a maximum pulse, or frequency, on the CAN bus 122. For instance, a data frame with a test pattern of 0xAA may be transmitted by the device via the CAN bus 122. In one embodiment, the Bus Manager receives the data frame with the test pattern and determines CAN bus communication quality. For instance, the Bus Manager may receive the test frame with errors (e.g., bytes other than 0xAA). These errors may be the result of degradation of the CAN bus 122. In this instance, the Bus Manager may initiate a change of baud rate to avoid further framing errors.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones, personal digital assistants, tablet computers and laptop computers, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects, processes and functions may be implemented within methods, acts, systems, system elements and components using a variety of hardware and software configurations, and examples are not limited to any particular distributed architecture, network, or communication protocol.

Figure 2:
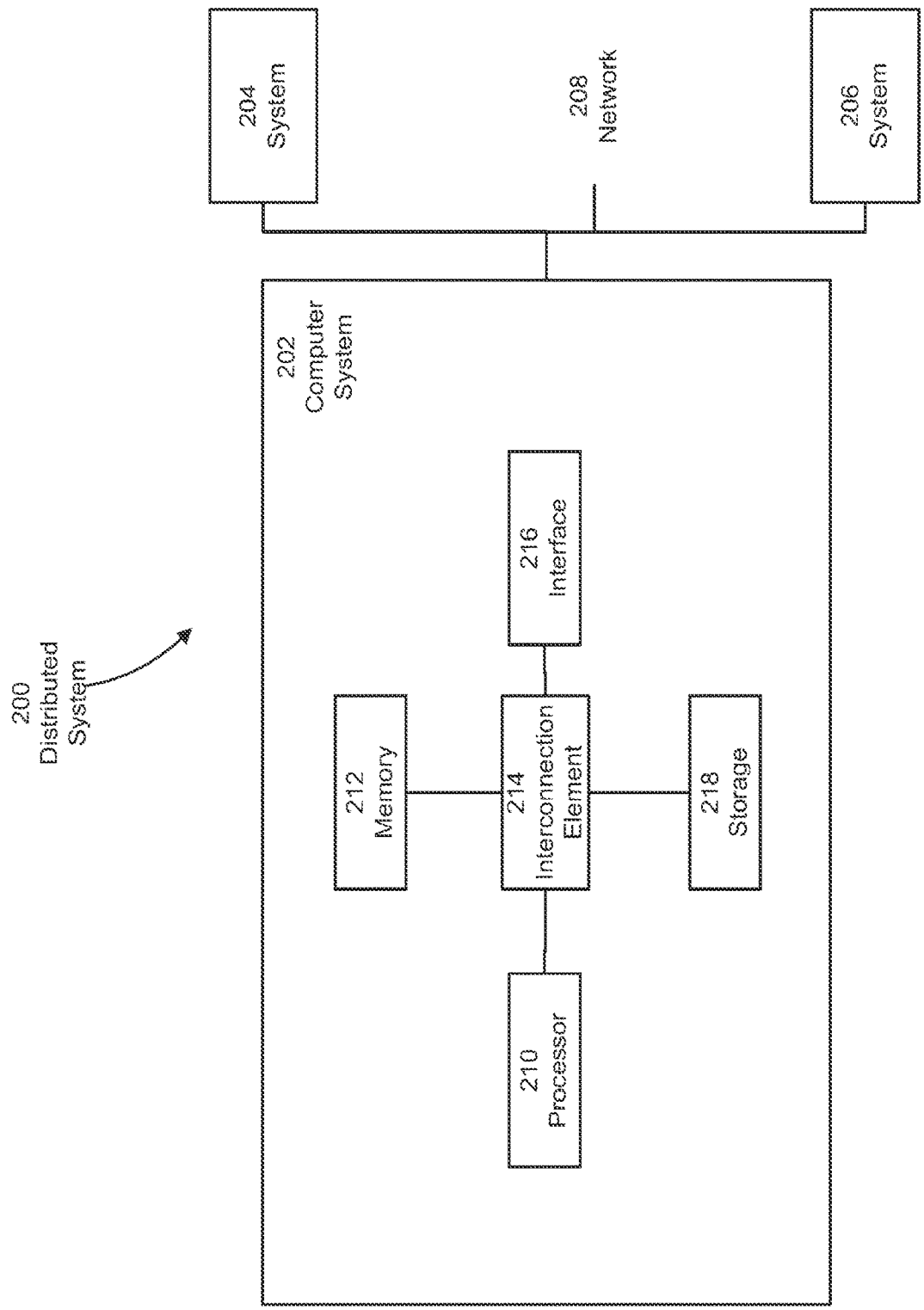
FIG. 2 is a block diagram illustrating an example of a computer system that executes processes and functions disclosed herein.

Referring to FIG. 2, there is illustrated a functional schematic of a distributed computer system 200 in which various aspects and functions are practiced. As shown, the distributed computer system 200 includes one more computer systems that exchange information. More specifically, the distributed computer system 200 includes computer systems 202, 204 and 206. As shown, the computer systems 202, 204 and 206 are interconnected by, and may exchange data through, a communication network 208. The network 208 may include any communication network through which computer systems may exchange data. To exchange data using the network 208, the computer systems 202, 204 and 206 and the network 208 may use various methods, protocols and standards, including, among others, RS-485, RS422, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TLS, SSL or VPN. While the distributed computer system 200 illustrates three networked computer systems, the distributed computer system 200 is not so limited and may include any number of computer systems and computing devices, networked using any medium and communication protocol.

FIG. 2 illustrates a particular example of a distributed computer system 200 that includes computer system 202, 204 and 206. As illustrated in FIG. 2, the computer system 202 includes a processor 210, a memory 212, a bus 214, an interface 216 and data storage 218. To implement at least some of the aspects, functions and processes disclosed herein, the processor 210 performs a series of instructions that result in manipulated data. The processor 210 may be any type of processor, multiprocessor, controller or microcontroller. Some exemplary processors include commercially available processors such as a Stellaris ARM Cortex-M3, Intel Xeon, Itanium, Core, Celeron, Pentium, AMD Opteron, Sun UltraSPARC, IBM Power5+ and IBM mainframe chip. The processor 210 is connected to other system components, including one or more memory devices 212, by the bus 214.

The memory 212 stores programs and data during operation of the computer system 202. Thus, the memory 212 may be a relatively high performance, volatile, random access memory such as a dynamic random access memory (DRAM) or static memory (SRAM). However, the memory 212 may include any device for storing data, such as a disk drive or other non-volatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the bus 214. The bus 214 may include one or more physical busses, for example, busses between components that are integrated within a same machine, but may include any communication coupling between system elements including specialized or standard computing bus technologies such as IDE, SCSI, PCI and InfiniB and. Thus, the bus 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and communicate with external entities, such as users and other systems.

The data storage 218 includes a computer readable and writeable nonvolatile (non-transitory) data storage medium in which instructions are stored that define a program or other object that is executed by the processor 210. The data storage 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage 218. The memory may be located in the data storage 218 or in the memory 212, however, the processor 210 manipulates the data within the memory, and then copies the data to the storage medium associated with the data storage 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include MicroC/OS-II, available from Micrium, Inc., a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or to file defined by a user mode application) or in a commonly shared data structure (such as an application registry that is defined by an operating system). In addition, some examples provide for both system and user interfaces that allow external entities to modify the parameters and thereby configure the behavior of the components.

Auto Baud Rate Selection Processes

Figure 3:
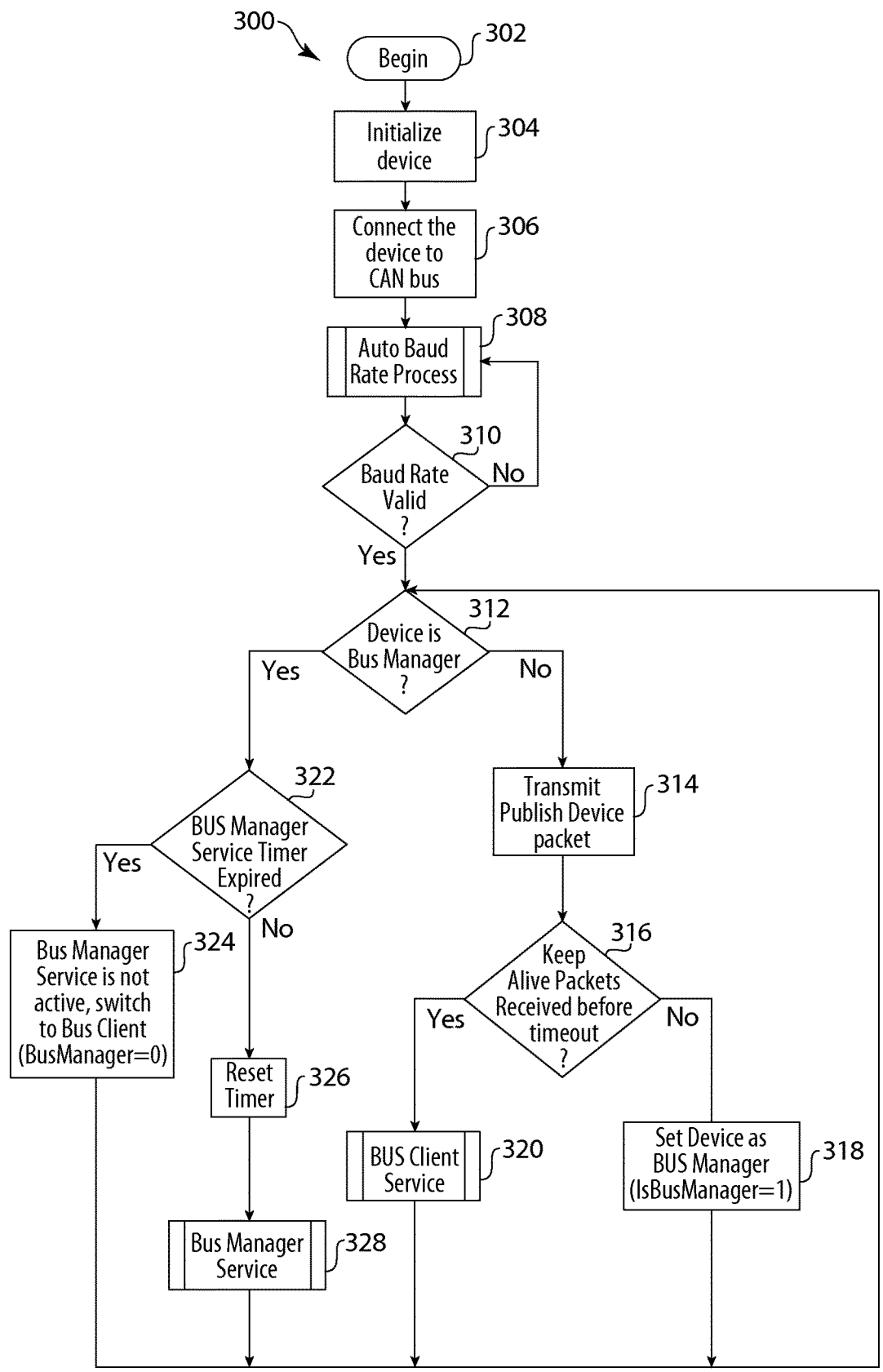
FIG. 3 is a flow diagram illustrating one example of a device control process according to some aspects and embodiments.

FIG. 3 illustrates one example of a device control process 300. The process 300 begins in act 302.

In act 304, a device (e.g., device 104, 106, 108, and 110 of FIG. 1), boots up and is initialized. In one embodiment, initialization includes determining that a CAN controller is available. In act 306, the device is communicatively coupled to a CAN bus, such as the CAN bus 122 of FIG. 1. In one embodiment, the device is communicatively coupled to the CAN bus by closing a CAN isolation relay. As discussed above with reference to FIG. 1, the device may initially operate in "listen only" mode to avoid introducing framing errors on the CAN bus.

In act 308, an auto baud rate process is executed, such as the auto baud rate process 400 discussed below with reference to FIG. 4. In one embodiment, the auto baud rate process may adjust the device's baud rate incrementally until a valid baud rate is negotiated. In act 310, if the device fails to determine a valid baud rate, the process may return to the act 308. If the device does determine a valid baud rate, the process continues to act 312.

In act 312, the device determines if the device is to operate as a Bus Manager or a Bus Client. If the device is operating as a Bus Manager, the process continues to act 322. If the device is not operating as the Bus Manager, the process continues to act 314.

In act 314, the device transmits a publish device request (PUBLISH_DEVICE) via the CAN bus. In act 316, the device determines if a keep-live data frame has been received prior to a predetermined period of time elapsing. In one embodiment, the device may be configured to wait a random period of time (e.g., between 2500*ms*-5000*ms*). In this embodiment, each device waiting a random period to of time may insure that two devices do not simultaneously switch to operating as the Bus Manager. If the random period of time has elapsed before a keep-alive data frame is received from the Bus Manager, the process continues to act 318. If the keep-alive data frame is received from the Bus Manager prior to the random period of time elapsing, the process continues to act 320. In act 318, the device may set an IsBusManager status flag to 1, and then the process returns to act 312. In act 320 the process may execute a bus client service, such as the bus client service process 800 of FIG. 8, and then return to act 312.

In at least one embodiment, the process returns to the act 312 with a IsBusManager statuts flag set to 1. For example, a random period of time may have elapsed in act 316 prior to the device receiving a keep-alive data frame from the Bus Manager. In this example, in act 318 the process sets the IsBusManager status flag to 1. With the IsBusManager status flag equal to 1 the device operates as the Bus Manager.

In act 322, a watchdog timer is checked to determine if a bus manager service has been idle for more than a predetermined period of time. In one embodiment, if the bus manager service has encountered an exception, or otherwise fails to properly execute, the watchdog timer determines that the bus manager service is no longer active and takes appropriate action. If the watchdog timer has expired, the process continues to act 324. If the watchdog timer has not expired, the process continues to act 326.

In act 324, the process sets the IsBusManager status flag to 0 and the process returns to the act 312. With the IsBusManager status flag set to 0 the device operates as a Bus Client.

In act 326, the watchdog timer is reset and the process continues to act 328. In act 328, the process executes a bus manager service process, such as the bus manager service process 700 of FIG. 7, and then the process returns to act 312.

Auto Baud Rate Process

As discussed above with regard to FIG. 3, a device may be configured to execute an auto baud rate process. One example of an auto bad rate process 400 is illustrated in FIG. 4. The process 400 begins in act 402.

In act 404, the device enters a "listen only" mode. In one embodiment, the device enters listen only mode by disabling a CAN controller's transceiver output driver. In the listen only mode, the device will receive data via a CAN bus, but will not transmit data (e.g., to avoid the introduction of framing errors).

In act 406, the device selects the lowest baud rate possible (e.g., 62.5 Kbps). Also in act 406, the device sets the IsBusManager status flag to 1. In act 408, the device listens on a CAN bus, such as the CAN bus 122 of FIG. 1, for data transmitted from other devices (e.g., devices 104, 106, 108 and 110 of FIG. 1). In act 410, if data is received then another device is on the bus (e.g., a Bus Manager), and the process continues to act 412. If no data is received then there may not be another device on the CAN bus, or no devices operating as the Bus Manager, and the process continues to act 434.

In act 412, the device sets the IsBusManager status flag to 0. In act 414, if a framing error is detected then there may be a baud rate mismatch. If a framing error is detected, the process continues to act 416. If no framing error is detected, the process continues to act 430. In act 430, the device may execute a verify connection process, such as the verify connection process 600 of FIG. 6 discussed further below. If the verify connection process is successful, the process continues to act 432 and ends returning a success code. If the verify connection process fails, the process continues to act 432 and ends returning a failure code. The success code and the failure code may be utilized by a process, such as in the act 310 of the process 300 of FIG. 3, to determine if a valid baud rate has been determined for the device.

In act 416, the device may reset the CAN controller. In act 418, the device may determine if a predetermined number of retries has been exceeded. For example, the device may attempt to verify the baud rate is valid a number of times (e.g., 3), before switching to a different baud rate. If the number of retries has been exceeded, the process continues to act 420. If the number of retries has not been exceeded, the process continues to act 430.

In act 420, the device determines if all baud rates have been attempted. If all to baud rates have been attempted, the process continues to act 424. If all baud rates have not been attempted, the process continues to act 422.

In act 422, the next baud rate is selected and the process returns to act 408. In act 424, if the number of retries (e.g., 3) to negotiate a valid baud rate via the CAN bus exceeds a predetermined retry count, the process exits in act 426 and returns a failure code. This failure code may be utilized by a process, such as in the act 310 of the process 300 of FIG. 3, to determine that a valid baud rate has not been set for the device. If the number of retries has not exceeded the predetermined retry count, the process returns to act 406.

Returning to act 410, if no data was received via the CAN bus, the process continues to act 434. In act 434, the device determines if a timer has elapsed or if a ForceNegotiation status flag is set to 1. In one embodiment, if no data is received after the timer elapses, the device may determine that no other devices are communicatively coupled to the CAN bus. In this embodiment, the process continues to act 436. If the timer has not elapsed and the ForceNegotiation flag is not set to 1, the process returns to act 408.

In act 436, the device checks if the IsBusManager status flag, or the ForceNegotiation status flag, is set to 1. If either status flag is set to 1, the process continues to act 442. If neither status flag is set to 1, the process continues to act 438.

In act 438, if a retry count exceeds a predetermined value (e.g., 3), the process continues to act 440. If the retry count does not exceed a predetermined value, the process returns to act 408. In act 440, the ForceNegotiationFlag is set to 1 and the process returns to act 408.

In act 442, the ForceNegotiation status flag is cleared (e.g., set to 0), the retry counter is cleared, and the timer is reset. In act 444, the process executes a data transfer process, such as the data transfer process 500 of FIG. 5 discussed below. In one embodiment, the data transfer process transmits a keep-alive data frame and determines whether the keep-alive data frame was acknowledged by other devices on the CAN bus. After the data transfer process ends, the device switches back to listen only mode and returns to act 408.

Data Transfer Process

As discussed above with reference to FIG. 4, a device may execute a data transfer process to transmit a keep-alive data frame. FIG. 5 illustrates one example of a data transfer process 500. The process 500 begins in act 502.

In act 504, the device enables its CAN controller's transmitter. In act 506, the device transmits a keep-alive data frame via the CAN bus. In act 508, the device determines if an acknowledgement is received from one or more devices (e.g., devices 104, 106, 108, and 110) communicatively coupled to a CAN Bus, such as the CAN bus 122 of FIG. 1. If no acknowledgement is received, the process continues to act 510. If an acknowledgement is received, the process continues to act 514.

In act 510, the device checks a frame wait timer. If the frame wait timer has not exceeded a predetermined period of time (e.g., 100 ms), the process returns to the act 508. If the frame wait timer has elapsed beyond the predetermined period of time, the process exits in act 512 and returns a failure code.

In act 514, the IsBusManager status flag is set to 1. In act 516, the device disables the CAN controller's transmitter (e.g., listen-only mode). In act 518, the process exits and returns a success code.

Verify Connection Process

Figure 6:
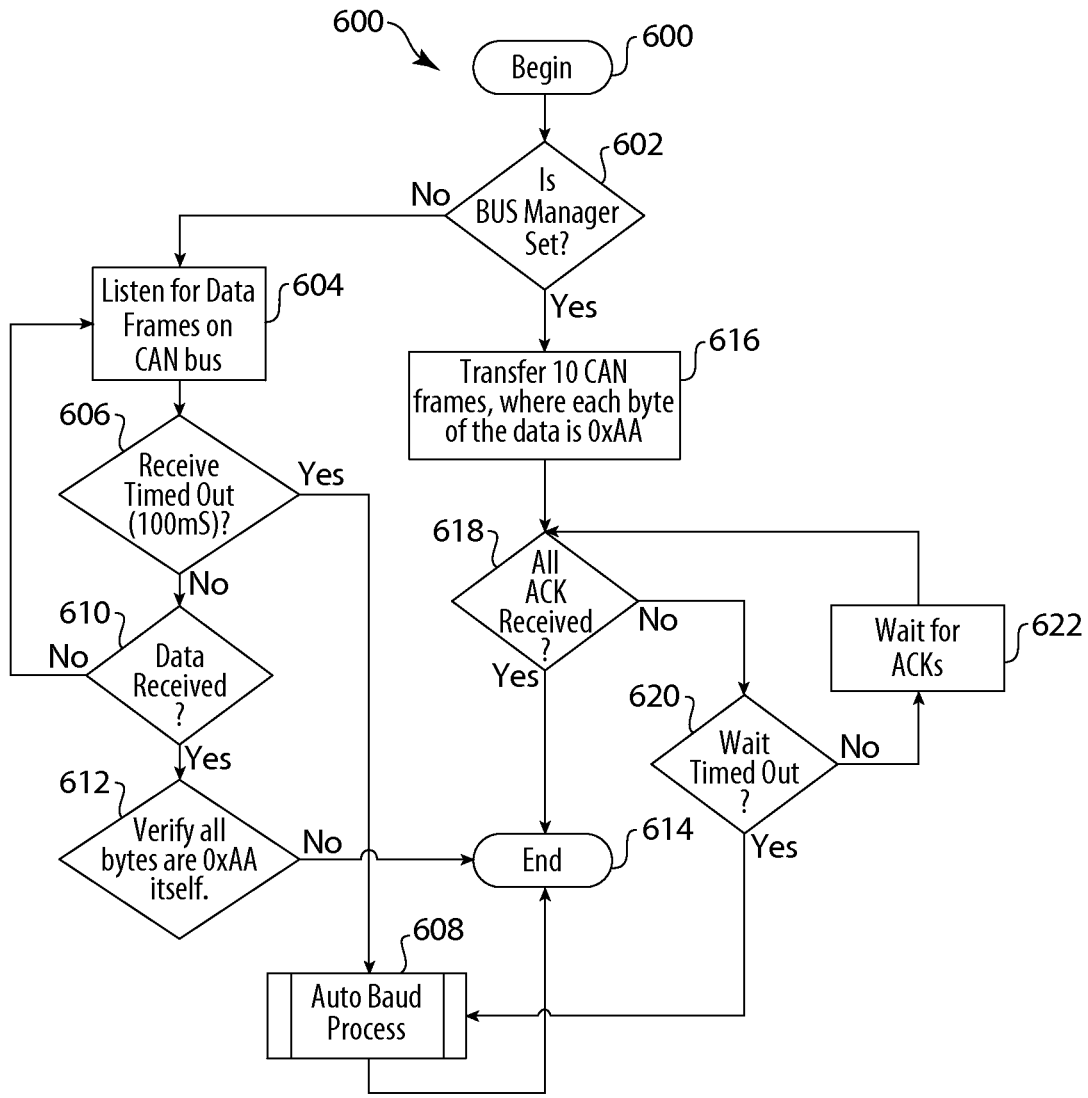
FIG. 6 is a flow diagram illustrating one example of a verify connection process according to some aspects and embodiments.

As discussed above with reference to FIG. 4, a device may execute a verify connection process to verify a negotiated baud rate by transmitting or receiving test data frames (e.g., test data pattern 0xAA in all data frame fields). FIG. 6 illustrates one example of a verify connection process 600. The process 600 begins in act 602.

In act 602, the process determines if the device is operating as a Bus Manager or a Bus Client. If the device is operating as a Bus Manager (e.g., IsBusManager=1), the process continues to act 604. If the device is operating as a Bus Client (e.g., IsBusManager=0), the process continues to act 616.

In act 604, the device listens for data frames received via the CAN bus. In act 606, a receive timeout is checked to determine if a predetermined period of time has elapsed prior to a data frame being received in act 604. If the receive timeout has to elapsed, the process continues to act 608. If the receive timeout has not elapsed, the process continues to act 610.

Figure 4:
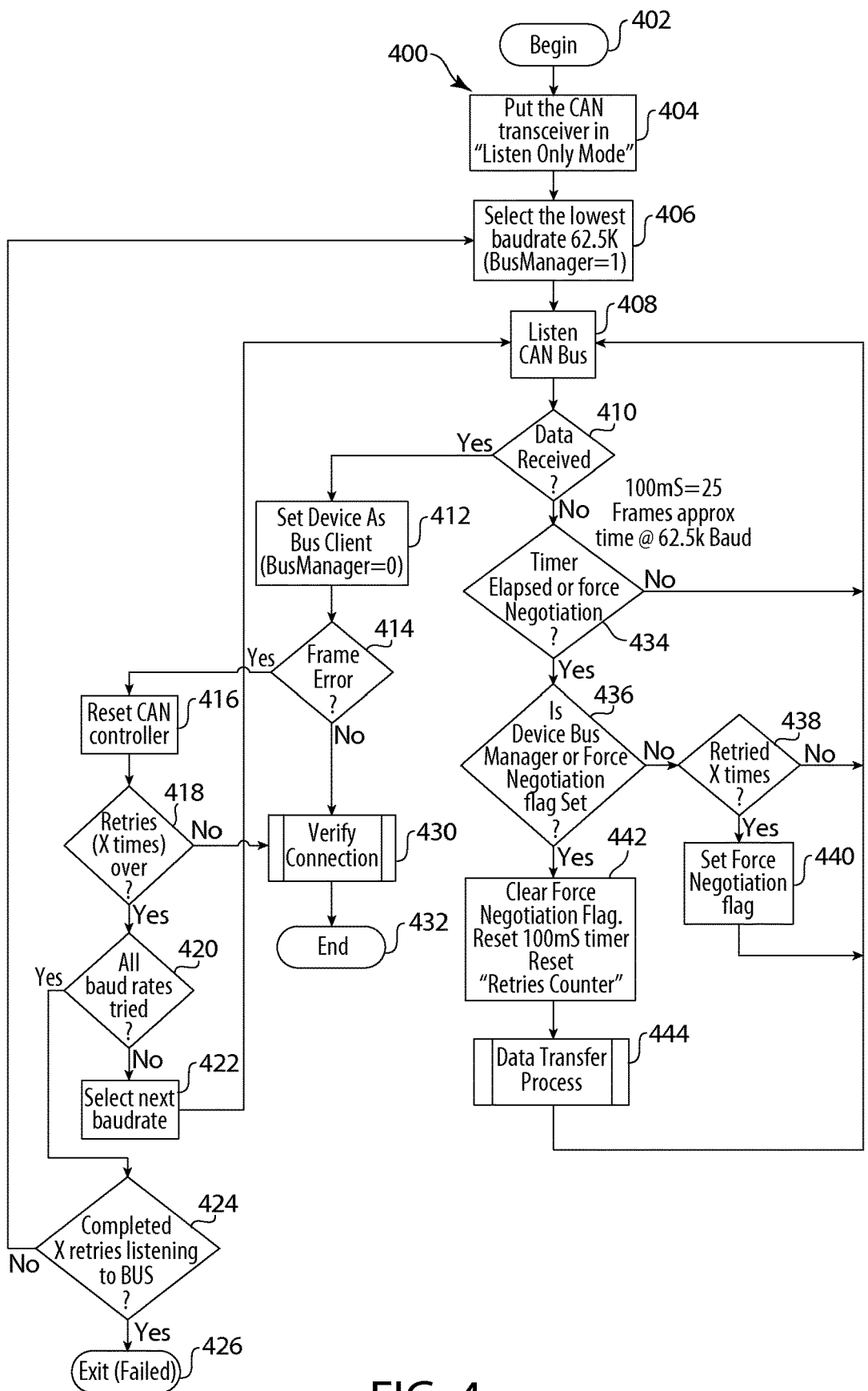
FIG. 4 is a flow diagram illustrating one example of an auto baud rate process according to some aspects and embodiments.
Figure 5:
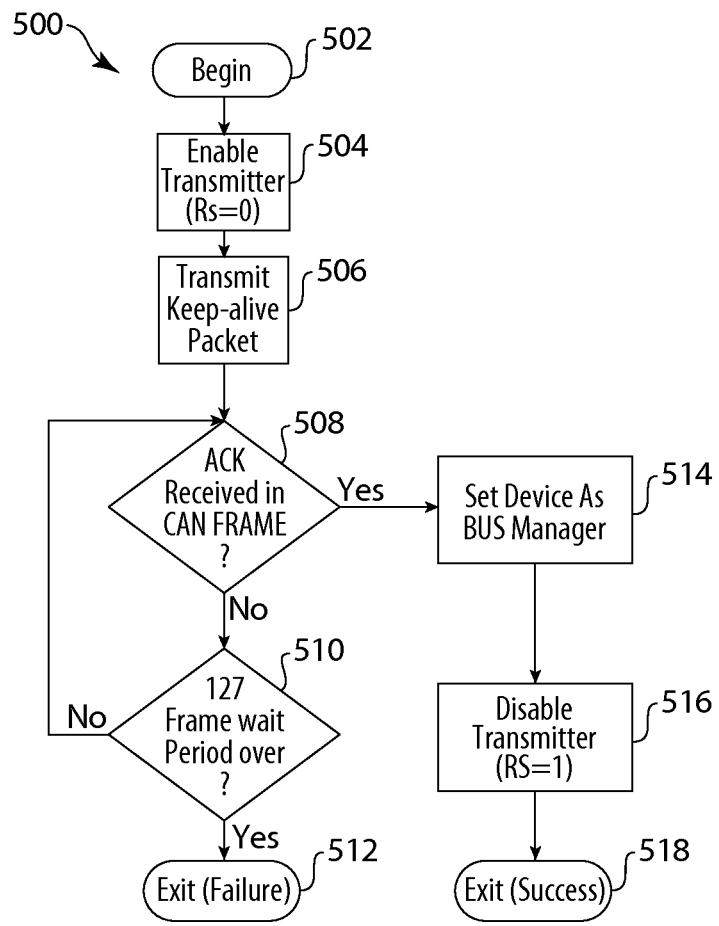
FIG. 5 is a flow diagram illustrating one example of a data transfer process according to some aspects and embodiments.

In act 608, the process executes an auto baud rate process, such as the auto baud rate process 400 of FIG. 4 discussed above. In act 614, the process ends.

In act 610, if the device has not received a data frame the process returns to act 604 and continues to listen for data frames until the receive timeout expires. If the device has received a data frame the process continues to act 612. If the device has not received a data frame the process returns to act 604.

In act 612, the data frame received in act 610 is verified. In one embodiment, verification may include checking for a test data pattern (e.g., 0xAA). In this embodiment, if the data frame does not have the test pattern (because of framing errors) then the device may determine that a degradation of the CAN bus has occurred. In act 614 the process ends.

Returning to act 602, if the device determines that it is operating in Bus Client mode (e.g., IsBusManager=0), then the process continues to act 616. In act 616, the device may transmit a number of data frames including a test data pattern. For instance, data frames with a data pattern of 0xAA may be transmitted by the device via the CAN bus. In act 618, the device checks to see if all of the data frames have been acknowledged by another device communicatively coupled to the CAN bus (e.g., the Bus Manager). If all data frames have been acknowledged, the process ends in act 614. If fewer than all of the data frames have been acknowledged, the process continues to act 620.

In act 620, a wait timeout is checked to determine if a predetermined period of time has elapsed prior to all acknowledgements being received. If the wait timeout has not elapsed, the process continues to act 622. If the wait timeout has elapsed, the process continues to act 608.

In act 622, the process continues to wait for acknowledgement of the data frames sent in act 616. Subsequent to waiting for acknowledgement of the data frames, the process returns to act 618.

In act 608 the process executes an auto baud rate process, such as the auto baud rate process 400 of FIG. 4 discussed above. In act 614, the process ends.

Bus Manager Service Process

Figure 7:
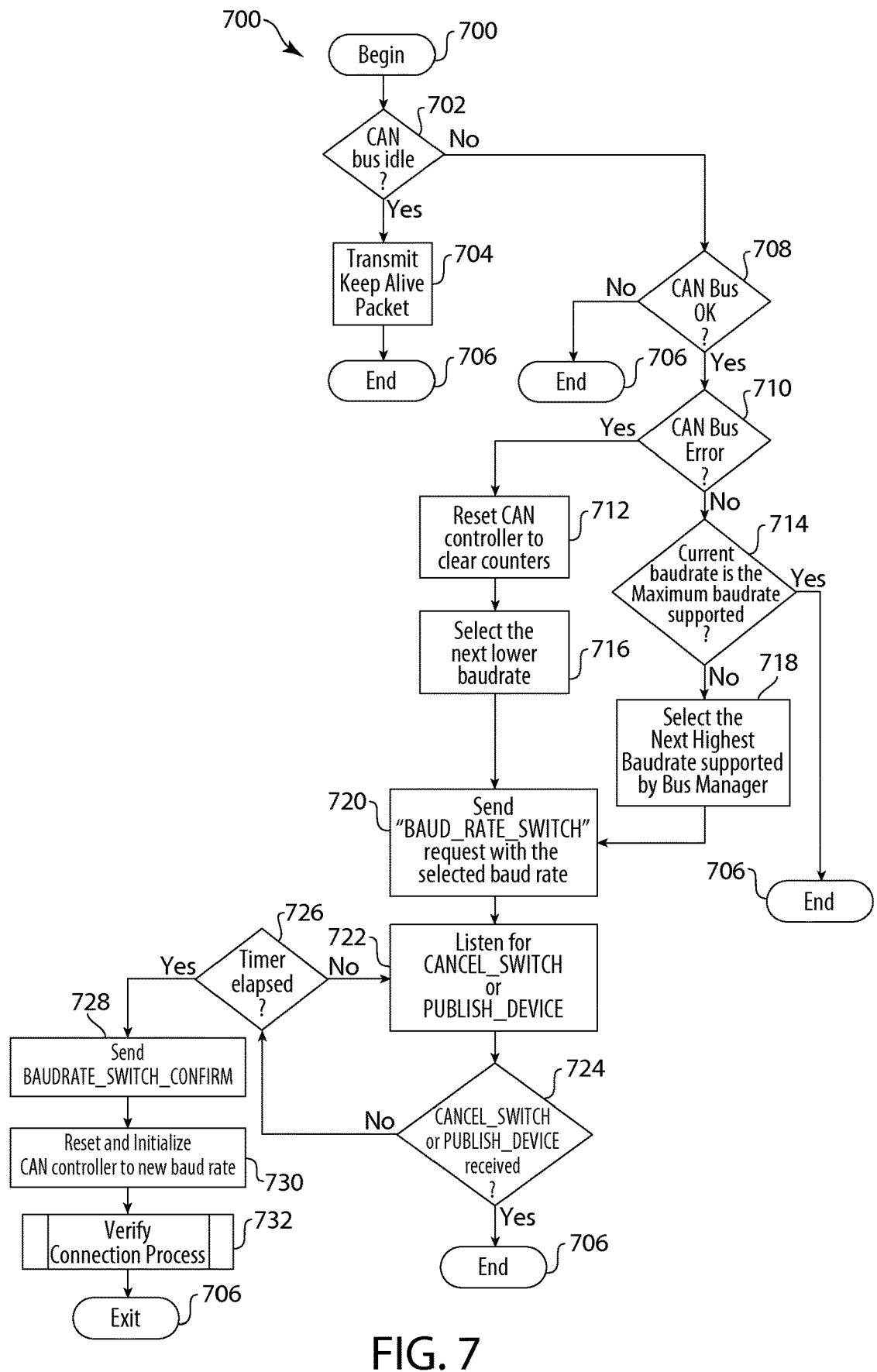
FIG. 7 is a flow diagram illustrating one example of a bus manager service process according to some aspects and embodiments.

As discussed above with reference to FIG. 3, a device may execute a bus manager service if the device is currently operating as a Bus Manager. FIG. 7 illustrates one example of a bus manager service 700. The process 700 begins in act 702.

In act 702, the device checks if a CAN bus, such as the CAN bus 122 of FIG. 1, has been idle for a predetermined period of time (e.g., 125 ms). If the CAN bus has been idle for the predetermined period of time, the process continues to act 704. If the CAN bus has not been idle for the predetermined period of time, the process continues to act 708.

In act 704, the device transmits a keep-alive data frame via the CAN bus. In act 706 the process ends.

In act 708, the process may perform a CAN bus check. If the device determines the last CAN bus check was performed recently (e.g., less than a second ago), the process ends in act 706. If the device determines the last CAN bus check was not performed recently, the process continues to act 710.

In act 710, the device determines whether the CAN bus is accessible and the quality of the CAN bus. In one embodiment, the device may determine the state of the CAN bus. For instance, the device's CAN controller may be in a BUS_PASSIVE (listen only) or a BUS_OFF (disabled) mode. If the device determines the CAN bus is not active, the process continues to act 712 and then act 716 to reset the CAN controller and select a lower baud rate. In at least one embodiment, the device may also determine CAN bus quality in act 710. In this embodiment, the device may query the device's CAN controller for a receive/transmit error count. If the error count exceeds a predetermined number (e.g., 96), the process continues to act 712. If the error count does not exceed a predetermined number (e.g., the CAN bus quality is good), the process continues to act 714.

In act 712, the device resets its CAN controller and clears all counters (including the error count). In act 716, a lower baud rate may be selected and the process continues to act 720.

In act 714, if a current baud rate of the device is a maximum supported baud rate then the process ends in act 706. If the current baud rate of the device is not the maximum supported baud rate, then the process continues to act 718. In act 718, the device selects the next highest baud rate and the process continues to act 720.

In act 720, the device transmits a baud rate switch request (BAUD_RATE_SWITCH) via the CAN bus which includes an identifier of a new baud rate selected in either act 716 or act 718.

In act 722, the device listens for a negative acknowledgement (e.g., CANCEL_SWITCH, PUBLISH_DEVICE) from a device (e.g., devices 104, 106, 108, and 110 of FIG. 1) coupled to the CAN bus. In act 724, if a negative acknowledgement is not received, the device continues to act 726. If a negative acknowledgement is received, the device may abandon the attempt to switch baud rates. In one embodiment, the device receives a cancel switch response (CANCEL_SWITCH) when a device is unable to support the new baud rate. In another embodiment, the device receives a publish device request (PUBLISH_DEVICE) which indicates that a new device has been added to the CAN bus and/or a device is negotiating a baud rate for the CAN bus, and thus, the switch to a new baud rate should be delayed until the new device is online. If a negative acknowledgement response is received, the device abandons the attempt to switch baud rates and the process ends in act 706.

In act 726, the device waits a predetermined amount of time (e.g., 5 seconds) for responses to the baud rate switch request (BAUD_RATE_SWTICH). If the predetermined amount of time has not elapsed, the process returns to act 722 and continues to listen for responses. If the predetermined amount of time has elapsed, the process continues to act 728. In act 728, the device sends a baud rate switch confirm request (BAUD_RATE_SWITCH_CONFIRM). In one embodiment, devices receiving the baud rate switch confirm request will set their CAN controller's baud rate to the new baud rate. In act 730, the device resets and initializes its CAN controller to the new baud rate identified in either act 716 or act 718. In act 732, the device executes a verify connection process, such as the verify connection process 600 of FIG. 6 discussed above, and the process ends in act 706.

Bus Client Service Process

Figure 8:
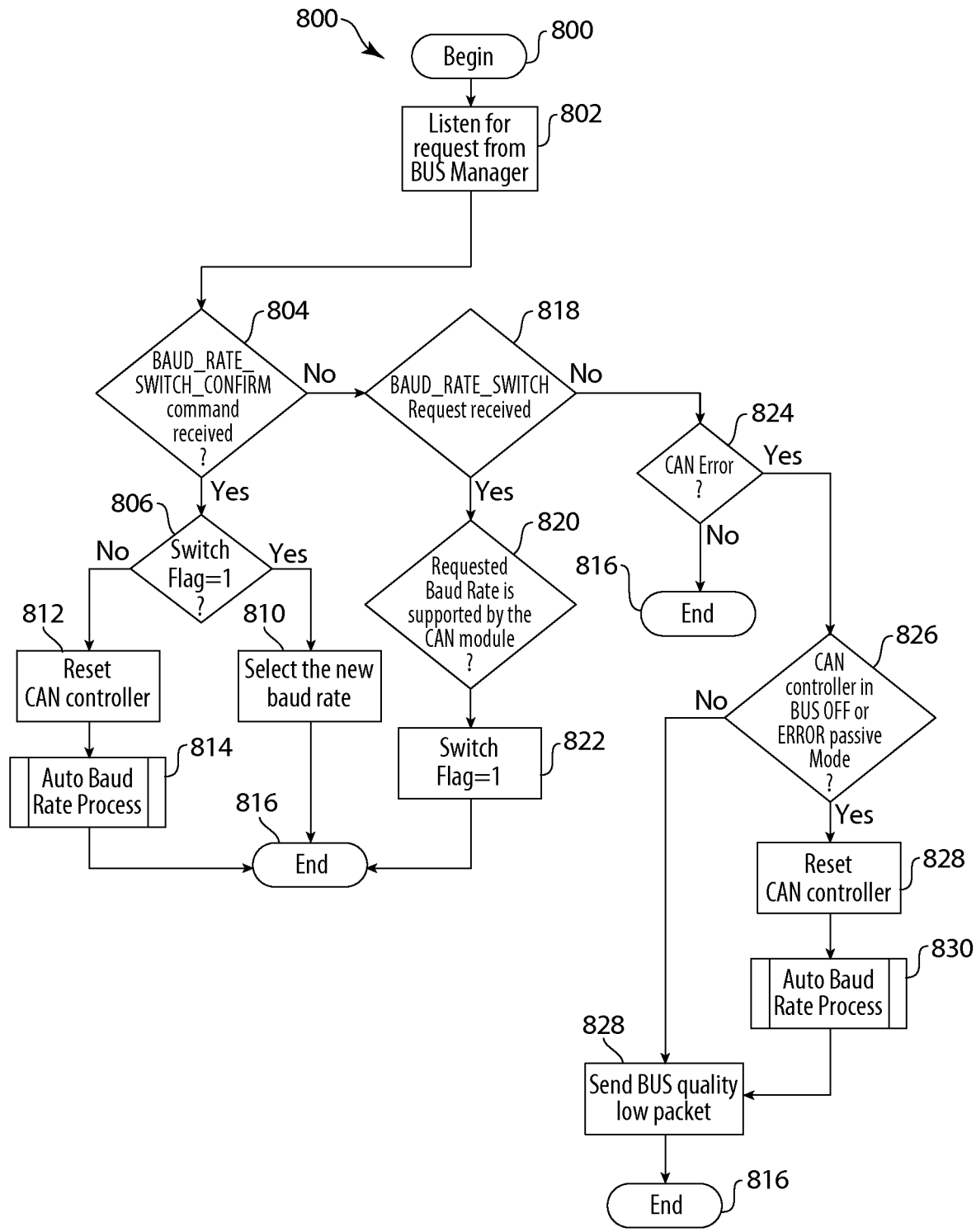
FIG. 8 is a flow diagram illustrating one example of a bus client service process according to some aspects and embodiments.

As discussed above with reference to FIG. 3, a device may execute a bus client service process if the device is currently operating as a Bus Client. FIG. 8 illustrates one example of a bus client service process 800. The process 800 begins in act 802. In act 802, the device listens for requests (e.g., BAUD_RATE_SWITCH, BAUD_RATE_SWITCH_CONFIRM, etc) from a Bus Manager via a CAN bus, such as the CAN bus 122 of FIG. 1.

In act 804, if a baud rate switch confirm request is received the process continues to act 806. If a baud rate switch confirm request is not received the process continues to act 818.

In act 806, the device checks a SwitchFlag status flag. If the SwitchFlag status flag is 1, the process continues to act 810. If the SwitchFlag status flag is zero (e.g., due to incompatibility with the new baud rate), the process continues to act 812.

In act 810, the device sets a new baud rate identified in a baud rate switch request previously received in act 818 as discussed further below. In act 816, the process ends.

In act 812, the device resets its CAN controller. In act 814, the process executes an auto baud rate process, such as the auto baud rate process 400 of FIG. 4 discussed above. In act 816, the process ends.

Returning to act 804, if a received request is not a baud rate switch confirm request, the process continues to act 818. In act 818, if the received request is a baud rate switch request, the process continues to act 820. If the received request is not a baud rate switch, the process continues to act 824.

In act 820, if the new baud rate identified in the baud rate switch request is supported by the device's CAN controller, the process continues to act 820 and sets the SwitchFlag status flag to 1. If the new baud rate is not supported by the device's CAN controller, the process sets the SwitchFlag status flag to 0. In act 816, the process ends.

In act 824, the device queries its CAN controller for a transmit/receive error count. If the error count is below a predetermined number (e.g., 96), the process ends in act 816. If the error count is above the predetermined number, the process continues to act 826. In act 826, the device checks if its CAN controller is in a BUS_OFF or an ERROR_PASSIVE mode. In the event the CAN controller is in the BUS_OFF or the ERROR_PASSIVE, the device takes corrective action (e.g., setting its CAN controller to BUS_ACTIVE), and the process continues to act 828. If the CAN controller is not in a BUS_OFF or ERROR_PASSIVE mode, the process continues to act 832. In act 828, the device resets its CAN controller. In act 830, the process executes an auto baud rate process, such as the auto baud rate process 400 of FIG. 4 discussed above.

In act 832, the device sends a data frame via the CAN bus which indicates the BUS quality is low. In one embodiment, a device (e.g., device 104, 106, 108, and 110 of FIG. 1) operating as a Bus Manager receives the data frame and adjusts baud rates accordingly. In act 816, the process ends.

Processes 300-800 each depict one particular sequence of acts in a particular embodiment. The acts included in these processes may be performed by, or using, one or more computer systems or devices (uninterruptable power supplies, sensors, etc.) specially configured as discussed herein. Some acts are optional and, as such, may be omitted in accord with one or more embodiments. Additionally, the order of the acts can be altered, or other acts can be added, without departing from the scope of the embodiments described herein. Furthermore, as described above, in at least one embodiment, the acts are performed on particular, specially configured machines, namely an auto baud rate selection system configured according to the examples and embodiments disclosed herein.

Embodiments disclosed herein may be used in conjunction with various communication technologies and protocols. For example, some embodiments communicate using industrial protocols, such as MODBUS, Common Industrial Protocol, and BACnet, among others.

Having thus described several aspects of at least one example, it is to be appreciated that various alterations, modifications, and improvements will readily occur to those skilled in the art. For instance, examples disclosed herein may also be to used in other contexts. Such alterations, modifications, and improvements are intended to be part of this disclosure, and are intended to be within the scope of the examples discussed herein. Accordingly, the foregoing description and drawings are by way of example only.

What is claimed is:

1. A device comprising:
   a memory;
   a Controller Area Network (CAN) controller coupled to a CAN bus;
   at least one processor coupled to the memory and the CAN controller, the at least one processor being configured to:
   set the CAN controller to a first baud rate;
   determine a second baud rate;
   send, in response to determining and prior to setting the CAN controller to the second baud rate, a baud rate change request via the CAN bus, wherein the baud rate change request includes at least an identifier of the second baud rate;
   determine a timeout has elapsed;
   send, in response to determining the timeout has elapsed, a baud rate confirmation request via the CAN bus; and
   set the CAN controller to the second baud rate.

2. The device of claim 1, wherein the at least one processor is further configured to:
   receive a data frame from at least one device coupled to the CAN bus;
   determine, in response to receiving the data frame, that the CAN bus does not support the second baud rate based on an error count of the CAN controller;
   determine a lower baud rate, wherein the lower baud rate is less than the second baud rate; and
   send a baud rate change request via the CAN bus, wherein the baud rate change request includes at least an identifier of the lower baud rate.

3. The device of claim 1, wherein the at least one processor is further configured to:
   receive a data frame from at least one device coupled to the CAN bus;
   determine, in response to receiving the data frame, that the CAN bus supports the second baud rate based on an error count of the CAN controller;
   determine a higher baud rate, wherein the higher baud rate is greater than the second baud rate; and
   send a baud rate change request via the CAN bus, wherein the baud rate change request includes at least an identifier of the higher baud rate.

4. The device of claim 1, wherein the at least one processor is further configured to:
   receive a data frame from at least one device coupled to the CAN bus;
   determine, in response to receiving the data frame, that a CAN device coupled to the CAN bus does not support the second baud rate; and
   operate the CAN controller at the first baud rate.

5. The device of claim 1, wherein the at least one processor is further configured to:
   determine that an idle timeout has occurred; and
   switch, based on the idle timeout, to a client mode.

6. The device of claim 5, wherein the at least one processor is further configured to send at least one test data frame via the CAN bus, wherein the at least one test data frame includes a pattern of bytes causing the CAN bus to be signaled at a high frequency.

7. The device of claim 5, wherein the at least one processor is further configured to:
   receive a baud rate change request from a device coupled to the CAN bus, wherein the baud rate change request includes at least one identifier of a new baud rate;
   determine if the new baud rate is supported by the CAN controller; and
   send a negative acknowledgement via the CAN bus if the new baud rate is not supported by the CAN controller.

8. A computer-implemented method of selecting baud rates using a computer, the computer including a memory, a Controller Area Network (CAN) controller coupled to a CAN bus, and at least one processor coupled to the CAN controller and the memory, the method comprising:
   setting the CAN controller to a first baud rate;
   determining a second baud rate;

sending, in response to determining and prior to setting the CAN controller to the second baud rate, a baud rate change request via the CAN bus, wherein the baud rate change request includes at least an identifier of the second baud rate;
determining a timeout has elapsed;
sending, in response to determining the timeout has elapsed, a baud rate confirmation request via the CAN bus; and
setting the CAN controller to the second baud rate.

9. The method of claim 8, further comprising:
receiving a data frame from at least one device coupled to the CAN bus;
determining, in response to receiving the data frame, that the CAN bus does not support the second baud rate based on an error count of the CAN controller;
determining a lower baud rate, the lower baud rate being less than the second baud rate; and
sending a baud rate change request via the CAN bus, wherein the baud rate change request includes at least an identifier of the lower baud rate.

10. The method of claim 8, further comprising:
receiving a data frame from at least one device coupled to the CAN bus;
determining, in response to receiving the data frame, that the CAN bus supports the second baud rate based on an error count of the CAN controller;
determining a higher baud rate, the higher baud rate being greater than the second baud rate; and
sending a baud rate change request via the CAN bus, wherein the baud rate change request includes at least an identifier of the higher baud rate.

11. The method of claim 8, further comprising:
receiving a data frame from at least one device coupled to the CAN bus;
determining, in response to receiving the data frame, that a CAN device coupled to the CAN bus does not support the second baud rate; and
operating the CAN controller at the first baud rate.

12. The method of claim 8, further comprising:
determining an idle timeout has occurred; and
switching, based on the idle timeout, to a client mode.

13. The method of claim 12, further comprising sending at least one test data frame via the CAN bus, wherein the at least one test data frame includes a pattern of bytes causing the CAN bus to be signaled at a high frequency.

14. The method of claim 12, further comprising:
receiving a baud rate change request via the CAN bus, wherein the baud rate change request includes at least one identifier of a new baud rate;
determining if the new baud rate is supported by the CAN controller; and
sending a negative acknowledgement via the CAN bus if the new baud rate is not supported by the CAN controller.

15. A non-transitory computer readable medium having stored thereon sequences of instructions for selecting baud rates for a device coupled to a Controller Area Network (CAN) bus, the instructions causing at least one processor to:
set a CAN controller to a first baud rate;
determine a second baud rate;
send, in response to determining and prior to setting the CAN controller to the second baud rate, a baud rate change request via the CAN bus, wherein the baud rate change request includes at least an identifier of the second baud rate;
determine a timeout has elapsed;
send, in response to determining the timeout has elapsed, a baud rate confirmation request via the CAN bus; and
set the CAN controller to the second baud rate.

16. The non-transitory computer readable medium according to claim 15, wherein the sequences of instructions include instructions that cause the at least one processor to:
receive a data frame from at least one device coupled to the CAN bus;
determine, in response to receiving the data frame, that the CAN bus does not support the second baud rate based on an error count of the CAN controller;
determine a lower baud rate, wherein the lower baud rate is less than the second baud rate; and
send a baud rate change request via the CAN bus, wherein the baud rate change request includes at least an identifier of the lower baud rate.

17. The non-transitory computer readable medium according to claim 15, wherein the sequences of instructions include instructions that cause the at least one processor to:
receive a data frame from at least one device coupled to the CAN bus;
determine, in response to receiving the data frame, that the CAN bus supports the second baud rate based on an error count of the CAN controller;
determine a higher baud rate, wherein the higher baud rate is greater than the second baud rate; and
send a baud rate change request via the CAN bus, wherein the baud rate change request includes at least an identifier of the higher baud rate.

* * * * *